(12) United States Patent
Ohba et al.

(10) Patent No.: US 7,274,914 B2
(45) Date of Patent: Sep. 25, 2007

(54) OUTPUT POWER ERROR ABSORBING CIRCUIT AND MULTI-CARRIER TRANSMITTER HAVING THE SAME

(75) Inventors: Takeshi Ohba, Kawasaki (JP); Yasuhito Funyu, Kawasaki (JP); Hiroaki Abe, Kawasaki (JP); Tomohiro Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 514 days.

(21) Appl. No.: 11/018,258

(22) Filed: Dec. 21, 2004

(65) Prior Publication Data

US 2006/0046764 A1    Mar. 2, 2006

(30) Foreign Application Priority Data

Aug. 25, 2004   (JP)   ............................. 2004-245113

(51) Int. Cl.
*H04B 1/00*   (2006.01)

(52) U.S. Cl. .................................. 455/104; 455/114.2

(58) Field of Classification Search .................. None
See application file for complete search history.

(56) References Cited

U.S. PATENT DOCUMENTS 5,302,914 A * 4/1994 Arntz et al. ................ 330/129
6,236,864 B1   5/2001 McGowan et al.
6,999,733 B2 * 2/2006 Hori et al. ............... 455/114.2

FOREIGN PATENT DOCUMENTS

JP   2000-106548   4/2000
JP   2003-522433   7/2003

\* cited by examiner

*Primary Examiner*—Thanh Cong Le
(74) *Attorney, Agent, or Firm*—Katten Muchin Rosenman LLP (57) ABSTRACT

A power correction value generating unit determines a power correction value for minimizing an error, from a reference output power value of a carrier multiplexed signal, generating due to peak power suppression under a carrier setting based on the carrier setting relating to either one or both of the number of carrier signals and frequency arrangement, and peak suppression setting. An output power error correcting unit corrects a signal gain before or after the carrier signals are multiplexed, using the power correction value obtained by the power correction value generating unit. In an apparatus performing peak suppression according to an input limitation power of the power amplifier, it is possible to always obtain a desirable transmission (output) power even when the number of carriers or carrier frequency arrangement varies.

12 Claims, 11 Drawing Sheets

| NUMBER OF CARRIERS | CARRIER SETTING | | | | PATTERN NUMBER |
|---|---|---|---|---|---|
| | C1 | C2 | C3 | C4 | |
| 4 | O | O | O | O | 0 |
| 3 | O | O | O | | 1 |
| | | O | O | O | 1 |
| | O | O | | O | 2 |
| | O | | O | O | 2 |
| 2 | O | O | | | 3 |
| | | O | O | | 3 |
| | | | O | O | 3 |
| | O | | O | | 4 |
| | | O | | O | 4 |
| | O | | | O | 5 |
| 1 | O | | | | 6 |
| | | O | | | 6 |
| | | | O | | 6 |
| | | | | O | 6 |

| PATTERN | NUMBER OF CARRIERS | REFERENCE VALUE [dBm] |
|---|---|---|
| 0 | 4 | 46.0 |
| 1 | 3 | 44.8 |
| 2 | 3 | 44.8 |
| 3 | 2 | 43.0 |
| 4 | 2 | 43.0 |
| 5 | 2 | 43.0 |
| 6 | 1 | 40.0 |

INPUT            OUTPUT

FIG. 4

| PEAK SUPPRESSION SET VALUE | | PATTERN | | | | | | |
|---|---|---|---|---|---|---|---|---|
| [hex] | [dec] | 0 | 1 | 2 | 3 | 4 | 5 | 6 |
| 0 | 0 | 6.5[dB] | 6.0[dB] | 6.4[dB] | 5.4[dB] | 5.9[dB] | 5.9[dB] | 4.5[dB] |
| 1 | 1 | 6.5[dB] | 6.0[dB] | 6.4[dB] | 5.4[dB] | 5.9[dB] | 5.9[dB] | 4.6[dB] |
| 2 | 2 | 6.5[dB] | 6.0[dB] | 6.4[dB] | 5.4[dB] | 5.9[dB] | 5.9[dB] | 4.8[dB] |
| 3 | 3 | 6.5[dB] | 6.0[dB] | 6.4[dB] | 5.4[dB] | 5.9[dB] | 5.9[dB] | 5.0[dB] |
| 4 | 4 | 6.5[dB] | 6.0[dB] | 6.4[dB] | 5.4[dB] | 5.9[dB] | 5.9[dB] | 5.2[dB] |
| 5 | 5 | 6.5[dB] | 6.0[dB] | 6.4[dB] | 5.4[dB] | 5.9[dB] | 5.9[dB] | 5.5[dB] |
| 6 | 6 | 6.5[dB] | 6.0[dB] | 6.4[dB] | 5.5[dB] | 5.9[dB] | 5.9[dB] | 5.8[dB] |
| 7 | 7 | 6.5[dB] | 6.0[dB] | 6.4[dB] | 5.5[dB] | 6.0[dB] | 6.0[dB] | 6.2[dB] |
| 8 | 8 | 6.5[dB] | 6.0[dB] | 6.4[dB] | 5.6[dB] | 6.0[dB] | 6.0[dB] | 6.6[dB] |
| 9 | 9 | 6.5[dB] | 6.0[dB] | 6.5[dB] | 5.7[dB] | 6.0[dB] | 6.0[dB] | 6.9[dB] |
| A | 10 | 6.5[dB] | 6.0[dB] | 6.5[dB] | 5.8[dB] | 6.1[dB] | 6.1[dB] | 7.2[dB] |
| B | 11 | 6.5[dB] | 6.0[dB] | 6.5[dB] | 5.9[dB] | 6.2[dB] | 6.2[dB] | 7.6[dB] |
| C | 12 | 6.5[dB] | 6.1[dB] | 6.5[dB] | 6.1[dB] | 6.3[dB] | 6.3[dB] | 7.9[dB] |
| D | 13 | 6.5[dB] | 6.1[dB] | 6.6[dB] | 6.3[dB] | 6.5[dB] | 6.5[dB] | 8.3[dB] |
| E | 14 | 6.5[dB] | 6.1[dB] | 6.6[dB] | 6.4[dB] | 6.7[dB] | 6.6[dB] | 8.6[dB] |
| F | 15 | 6.5[dB] | 6.2[dB] | 6.6[dB] | 6.6[dB] | 6.9[dB] | 6.8[dB] | 8.9[dB] |
| 10 | 16 | 6.5[dB] | 6.3[dB] | 6.6[dB] | 6.9[dB] | 7.0[dB] | 7.0[dB] | 9.2[dB] |
| 11 | 17 | 6.5[dB] | 6.4[dB] | 6.7[dB] | 7.1[dB] | 7.2[dB] | 7.2[dB] | 9.6[dB] |
| 12 | 18 | 6.5[dB] | 6.5[dB] | 6.8[dB] | 7.3[dB] | 7.4[dB] | 7.4[dB] | 9.8[dB] |
| 13 | 19 | 6.6[dB] | 6.6[dB] | 6.9[dB] | 7.5[dB] | 7.6[dB] | 7.6[dB] | 9.9[dB] |
| 14 | 20 | 6.6[dB] | 6.7[dB] | 7.0[dB] | 7.7[dB] | 7.8[dB] | 7.8[dB] | 10.0[dB] |
| 15 | 21 | 6.6[dB] | 6.9[dB] | 7.1[dB] | 7.9[dB] | 8.0[dB] | 8.0[dB] | 10.1[dB] |
| 16 | 22 | 6.7[dB] | 7.1[dB] | 7.2[dB] | 8.2[dB] | 8.2[dB] | 8.2[dB] | 10.2[dB] |
| 17 | 23 | 6.8[dB] | 7.2[dB] | 7.3[dB] | 8.4[dB] | 8.4[dB] | 8.4[dB] | 10.2[dB] |
| 18 | 24 | 6.9[dB] | 7.3[dB] | 7.5[dB] | 8.6[dB] | 8.6[dB] | 8.6[dB] | 10.2[dB] |
| 19 | 25 | 7.0[dB] | 7.5[dB] | 7.7[dB] | 8.8[dB] | 8.8[dB] | 8.8[dB] | 10.2[dB] |
| 1A | 26 | 7.1[dB] | 7.7[dB] | 7.9[dB] | 9.0[dB] | 9.0[dB] | 9.0[dB] | 10.2[dB] |
| 1B | 27 | 7.2[dB] | 7.9[dB] | 8.1[dB] | 9.2[dB] | 9.2[dB] | 9.2[dB] | 10.2[dB] |
| 1C | 28 | 7.4[dB] | 8.1[dB] | 8.3[dB] | 9.4[dB] | 9.4[dB] | 9.4[dB] | 10.2[dB] |
| 1D | 29 | 7.5[dB] | 8.3[dB] | 8.5[dB] | 9.6[dB] | 9.6[dB] | 9.6[dB] | 10.2[dB] |
| 1E | 30 | 7.6[dB] | 8.5[dB] | 8.7[dB] | 9.8[dB] | 9.8[dB] | 9.8[dB] | 10.2[dB] |
| 1F | 31 | 7.8[dB] | 8.7[dB] | 8.9[dB] | 9.9[dB] | 9.9[dB] | 9.9[dB] | 10.2[dB] |
| 20 | 32 | 7.9[dB] | 8.9[dB] | 9.1[dB] | 10.0[dB] | 10.0[dB] | 9.9[dB] | 10.2[dB] |
| 21 | 33 | 8.0[dB] | 9.1[dB] | 9.2[dB] | 10.1[dB] | 10.0[dB] | 10.0[dB] | 10.2[dB] |
| 22 | 34 | 8.1[dB] | 9.2[dB] | 9.4[dB] | 10.2[dB] | 10.0[dB] | 10.0[dB] | 10.2[dB] |
| 23 | 35 | 8.2[dB] | 9.4[dB] | 9.5[dB] | 10.3[dB] | 10.0[dB] | 10.0[dB] | 10.2[dB] |
| 24 | 36 | 8.3[dB] | 9.6[dB] | 9.6[dB] | 10.3[dB] | 10.0[dB] | 10.0[dB] | 10.2[dB] |
| 25 | 37 | 8.4[dB] | 9.7[dB] | 9.7[dB] | 10.3[dB] | 10.0[dB] | 10.0[dB] | 10.2[dB] |
| 26 | 38 | 8.5[dB] | 9.7[dB] | 9.8[dB] | 10.3[dB] | 10.0[dB] | 10.0[dB] | 10.2[dB] |
| 27 | 39 | 8.6[dB] | 9.8[dB] | 9.9[dB] | 10.3[dB] | 10.1[dB] | 10.0[dB] | 10.2[dB] |
| 28 | 40 | 8.7[dB] | 9.9[dB] | 10.0[dB] | 10.3[dB] | 10.1[dB] | 10.0[dB] | 10.2[dB] |
| 29 | 41 | 8.8[dB] | 10.0[dB] | 10.0[dB] | 10.3[dB] | 10.1[dB] | 10.0[dB] | 10.2[dB] |
| 2A | 42 | 8.9[dB] | 10.0[dB] | 10.0[dB] | 10.3[dB] | 10.1[dB] | 10.0[dB] | 10.2[dB] |
| 2B | 43 | 9.0[dB] | 10.0[dB] | 10.0[dB] | 10.3[dB] | 10.1[dB] | 10.0[dB] | 10.2[dB] |
| 2C | 44 | 9.1[dB] | 10.0[dB] | 10.0[dB] | 10.3[dB] | 10.1[dB] | 10.0[dB] | 10.2[dB] |
| 2D | 45 | 9.2[dB] | 10.0[dB] | 10.0[dB] | 10.3[dB] | 10.1[dB] | 10.0[dB] | 10.2[dB] |
| 2E | 46 | 9.3[dB] | 10.0[dB] | 10.0[dB] | 10.3[dB] | 10.1[dB] | 10.0[dB] | 10.2[dB] |
| 2F | 47 | 9.4[dB] | 10.0[dB] | 10.0[dB] | 10.3[dB] | 10.1[dB] | 10.0[dB] | 10.2[dB] |
| 30 | 48 | 9.5[dB] | 10.0[dB] | 10.0[dB] | 10.3[dB] | 10.1[dB] | 10.0[dB] | 10.2[dB] |

| PAR SETTING[dB] | PATTERN 0 | | PATTERN 1 | | PATTERN 2 | | PATTERN 3 | | PATTERN 4 | | PATTERN 5 | | PATTERN 6 | |
|---|---|---|---|---|---|---|---|---|---|---|---|---|---|---|
| | Pout[dBm] | CORRECTION VALUE[dB] | Pout[dBm] | CORRECTION VALUE[dB] | Pout[dBm] | CORRECTION VALUE[dB] | Pout[dBm] | CORRECTION VALUE[dB] | Pout[dBm] | CORRECTION VALUE[dB] | Pout[dBm] | CORRECTION VALUE[dB] | Pout[dBm] | CORRECTION VALUE[dB] |
| 6.00 | - | - | - | - | - | - | 41.90 | 1.10 | 40.56 | 2.44 | 40.56 | 2.44 | 39.57 | 0.43 |
| 6.10 | - | - | - | - | - | - | 42.00 | 1.00 | 41.29 | 1.71 | 41.31 | 1.69 | 39.60 | 0.40 |
| 6.20 | - | - | - | - | - | - | 42.15 | 0.85 | 41.59 | 1.41 | 41.55 | 1.45 | 39.63 | 0.37 |
| 6.30 | - | - | 43.36 | 1.36 | - | - | 42.24 | 0.76 | 41.84 | 1.16 | 41.84 | 1.16 | 39.66 | 0.34 |
| 6.40 | - | - | 43.58 | 1.14 | - | - | 42.38 | 0.62 | 41.96 | 1.04 | 41.95 | 1.05 | 39.69 | 0.31 |
| 6.50 | 43.37 | 2.63 | 43.77 | 0.95 | 41.55 | 3.17 | 42.45 | 0.55 | 42.10 | 0.90 | 42.07 | 0.93 | 39.71 | 0.29 |
| 6.60 | 44.20 | 1.80 | 43.90 | 0.82 | 42.89 | 1.83 | 42.51 | 0.49 | 42.20 | 0.80 | 42.26 | 0.74 | 39.74 | 0.26 |
| 6.70 | 44.70 | 1.30 | 44.00 | 0.72 | 43.37 | 1.35 | 42.56 | 0.44 | 42.27 | 0.73 | 42.33 | 0.67 | 39.76 | 0.24 |
| 6.80 | 45.01 | 0.99 | 44.10 | 0.62 | 43.65 | 1.07 | 42.60 | 0.40 | 42.35 | 0.65 | 42.41 | 0.59 | 39.79 | 0.21 |
| 6.90 | 45.16 | 0.84 | 44.20 | 0.52 | 43.79 | 0.93 | 42.64 | 0.36 | 42.42 | 0.58 | 42.49 | 0.51 | 39.82 | 0.18 |
| 7.00 | 45.30 | 0.70 | 44.26 | 0.46 | 43.95 | 0.77 | 42.70 | 0.30 | 42.52 | 0.48 | 42.55 | 0.45 | 39.84 | 0.16 |
| 7.10 | 45.40 | 0.60 | 44.34 | 0.38 | 44.02 | 0.70 | 42.73 | 0.27 | 42.58 | 0.42 | 42.60 | 0.40 | 39.86 | 0.14 |
| 7.20 | 45.50 | 0.50 | 44.40 | 0.32 | 44.14 | 0.58 | 42.76 | 0.24 | 42.62 | 0.38 | 42.63 | 0.37 | 39.88 | 0.12 |
| 7.30 | 45.56 | 0.44 | 44.45 | 0.27 | 44.22 | 0.50 | 42.80 | 0.20 | 42.67 | 0.33 | 42.67 | 0.33 | 39.90 | 0.10 |
| 7.40 | 45.59 | 0.41 | 44.48 | 0.24 | 44.30 | 0.42 | 42.83 | 0.17 | 42.72 | 0.28 | 42.72 | 0.28 | 39.92 | 0.08 |
| 7.50 | 45.67 | 0.33 | 44.52 | 0.20 | 44.35 | 0.37 | 42.85 | 0.15 | 42.75 | 0.25 | 42.76 | 0.24 | 39.93 | 0.07 |
| 7.60 | 45.72 | 0.28 | 44.54 | 0.18 | 44.40 | 0.32 | 42.86 | 0.14 | 42.77 | 0.23 | 42.78 | 0.22 | 39.94 | 0.06 |
| 7.70 | 45.75 | 0.25 | 44.56 | 0.16 | 44.43 | 0.29 | 42.87 | 0.13 | 42.80 | 0.20 | 42.80 | 0.20 | 39.95 | 0.05 |
| 7.80 | 45.78 | 0.22 | 44.58 | 0.14 | 44.47 | 0.25 | 42.88 | 0.12 | 42.83 | 0.17 | 42.84 | 0.16 | 39.96 | 0.04 |
| 7.90 | 45.83 | 0.17 | 44.60 | 0.12 | 44.51 | 0.21 | 42.90 | 0.10 | 42.85 | 0.15 | 42.86 | 0.14 | 39.97 | 0.03 |
| 8.00 | 45.85 | 0.15 | 44.61 | 0.11 | 44.53 | 0.19 | 42.91 | 0.09 | 42.86 | 0.14 | 42.88 | 0.12 | 39.98 | 0.02 |
| 8.10 | 45.87 | 0.13 | 44.62 | 0.10 | 44.56 | 0.16 | 42.92 | 0.08 | 42.87 | 0.13 | 42.90 | 0.10 | 39.98 | 0.02 |
| 8.20 | 45.89 | 0.11 | 44.63 | 0.09 | 44.59 | 0.13 | 42.94 | 0.06 | 42.88 | 0.12 | 42.92 | 0.08 | 39.99 | 0.01 |
| 8.30 | 45.91 | 0.09 | 44.65 | 0.07 | 44.61 | 0.11 | 42.94 | 0.06 | 42.89 | 0.11 | 42.93 | 0.07 | 39.99 | 0.01 |
| 8.40 | 45.92 | 0.08 | 44.66 | 0.06 | 44.62 | 0.10 | 42.94 | 0.06 | 42.90 | 0.10 | 42.94 | 0.06 | 39.99 | 0.01 |
| 8.50 | 45.93 | 0.07 | 44.67 | 0.05 | 44.64 | 0.08 | 42.95 | 0.05 | 42.91 | 0.09 | 42.95 | 0.05 | 39.99 | 0.01 |
| 8.60 | 45.94 | 0.06 | 44.68 | 0.04 | 44.65 | 0.07 | 42.95 | 0.05 | 42.92 | 0.08 | 42.96 | 0.04 | 40.00 | 0.00 |
| 8.70 | 45.95 | 0.05 | 44.69 | 0.03 | 44.66 | 0.06 | 42.96 | 0.04 | 42.93 | 0.07 | 42.96 | 0.04 | 40.00 | 0.00 |
| 8.80 | 45.96 | 0.04 | 44.69 | 0.03 | 44.67 | 0.05 | 42.96 | 0.04 | 42.94 | 0.06 | 42.96 | 0.04 | 40.00 | 0.00 |
| 8.90 | 45.97 | 0.03 | 44.70 | 0.02 | 44.68 | 0.04 | 42.97 | 0.03 | 42.95 | 0.05 | 42.97 | 0.03 | 40.00 | 0.00 |
| 9.00 | 45.98 | 0.02 | 44.70 | 0.02 | 44.69 | 0.03 | 42.97 | 0.03 | 42.96 | 0.04 | 42.97 | 0.03 | 40.00 | 0.00 |
| 9.10 | 45.98 | 0.02 | 44.70 | 0.02 | 44.69 | 0.03 | 42.98 | 0.02 | 42.96 | 0.04 | 42.97 | 0.03 | 40.00 | 0.00 |
| 9.20 | 45.99 | 0.01 | 44.70 | 0.02 | 44.70 | 0.02 | 42.98 | 0.02 | 42.96 | 0.04 | 42.98 | 0.02 | 40.00 | 0.00 |
| 9.30 | 45.99 | 0.01 | 44.70 | 0.02 | 44.70 | 0.02 | 42.98 | 0.02 | 42.96 | 0.04 | 42.98 | 0.02 | 40.00 | 0.00 |
| 9.40 | 45.99 | 0.01 | 44.71 | 0.01 | 44.70 | 0.02 | 42.99 | 0.01 | 42.97 | 0.03 | 42.98 | 0.02 | 40.00 | 0.00 |
| 9.50 | 46.00 | 0.00 | 44.71 | 0.01 | 44.71 | 0.01 | 42.99 | 0.01 | 42.98 | 0.02 | 42.98 | 0.02 | 40.00 | 0.00 |
| 9.60 | 46.00 | 0.00 | 44.71 | 0.01 | 44.71 | 0.01 | 42.99 | 0.01 | 42.98 | 0.02 | 42.98 | 0.02 | 40.00 | 0.00 |
| 9.70 | 46.00 | 0.00 | 44.72 | 0.00 | 44.72 | 0.00 | 42.99 | 0.01 | 42.98 | 0.02 | 42.98 | 0.02 | 40.00 | 0.00 |
| 9.80 | 46.00 | 0.00 | 44.72 | 0.00 | 44.72 | 0.00 | 42.99 | 0.01 | 42.98 | 0.02 | 42.98 | 0.02 | 40.00 | 0.00 |
| 9.90 | 46.00 | 0.00 | 44.72 | 0.00 | 44.72 | 0.00 | 42.99 | 0.01 | 42.98 | 0.02 | 42.98 | 0.02 | 40.00 | 0.00 |
| 10.00 | 46.00 | 0.00 | 44.72 | 0.00 | 44.72 | 0.00 | 42.99 | 0.01 | 42.98 | 0.02 | 42.98 | 0.02 | 40.00 | 0.00 |

OUTPUT POWER ERROR ABSORBING CIRCUIT AND MULTI-CARRIER TRANSMITTER HAVING THE SAME

CROSS REFERENCE TO THE RELATED APPLICATIONS

This application is based on and hereby claims priority to Japanese Application No. 2004-245113 filed on Aug. 25, 2004 in Japan, the contents of which are herby incorporated by reference.

BACKGROUND OF THE INVENTION (1) Field of the Invention

The present invention relates to an output power error absorbing circuit and a multi-carrier transmitter having the same, relating to a technique suitable for use to a radio communication apparatus having a multi-carrier amplifying function used in a cellular telephone system, a basic communication system, a broadcasting system or the like, for example.

(2) Description of Related Art

In the known code multiplexed signal circuit used in a transmitter in CDMA (Code Division Multiple Access) system, a power peak generates when codes and carrier signals are multiplexed, the peak components fall within the saturation region of the gain characteristic of the power amplifier after analog conversion, which causes distortion in the transmission signals. In order to suppress the peak components, a peak suppressing circuit is used.

Figure 9:
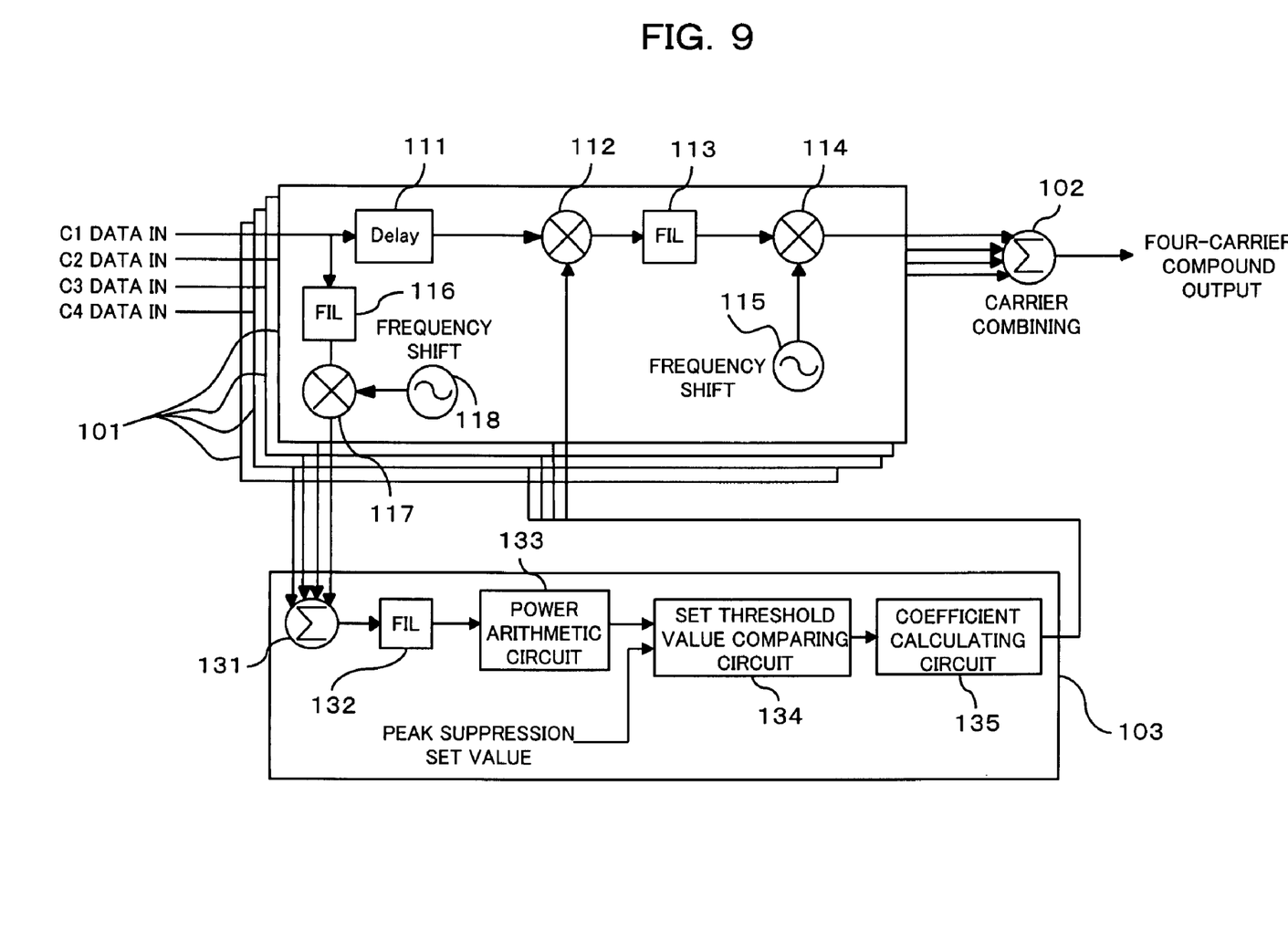
FIG. 9 is a block diagram showing structures of essential parts of a multi-carrier transmitter (code multiplexed signal circuit) having a known peak suppressing circuit.

FIG. 9 is a block diagram showing structures of essential parts of a multi-carrier transmitter (code multiplexed signal circuit) having the known peak suppressing circuit. The transmitter shown in FIG. 9 comprises carrier transmitting circuits 101 provided for a plurality of carrier signals (here, four carriers of C1, C2, C3 and C4), respectively, a carrier combining (multiplexing) circuit 102 combines the outputs from the carrier transmitting circuits 101, and a peak suppression value arithmetic circuit 103 which detects a power peak value after the carrier signals are combined, determines a peak suppression value (power correction value) used to suppress the peak value, corrects the gain of each of the carrier signals before combined by the carrier combining circuit 102 by using the peak suppression value, thereby suppressing the peak value after the carrier signals are combined.

Each of the carrier transmitting circuits 101 transmits a signal (carrier signal) at a predetermined carrier frequency. As shown in FIG. 9, each of the carrier transmitting circuits 101 comprises a delay circuit 111, multipliers 112, 114 and 117, digital filters 113 and 116, and local oscillators 115 and 118. The delay circuit 111, basically, delays inputted carrier signal data by predetermined symbols, and the digital filter (base band filter) 113 performs digital filtering (waveform shaping) on the data in order to remove the inter symbol interference (ISI). This filtering process is performed in order to prevent the data demodulation in the receiver from becoming difficult or impossible because interference occurs before and after certain data (symbol), and the eye pattern is confined when the data is modulated and demodulated. It is preferable that the digital filter 113 has the RRC (Root Raised Cosine) characteristic, and is a filter having the Raised Cosine characteristic at the combination of transmission and reception, for example.

The data undergone the filtering process is then undergone frequency shift by the multiplier 114 and the local oscillator 115 so that the data is in predetermined carrier frequency arrangement, and outputted to the carrier multiplexing circuit 102. Before the frequency shift, the multiplier 112 multiples the data by a suppression value determined by the peak suppression value arithmetic circuit 103, whereby the peak power is beforehand suppressed so as not to fall within the saturation region of a power amplifier (not shown) in the following stage (namely, so as not exceed the allowable input power value of the power amplifier).

On the other hand, the peak suppression value arithmetic circuit 103 comprises, as shown in FIG. 9, a combining (multiplexing) circuit 131, a digital filter 132, a power arithmetic circuit 133, a set threshold value comparing circuit 134 and a coefficient calculating circuit 135, for example. Each of signals is inputted to the combining circuit 131 through the digital filter 116, the multiplier 117 and the local oscillator 118 as a signal equivalent to the carrier signal to be outputted to the carrier multiplexing circuit 102. The combining circuit 131 combines (multiplexes) these signals. The digital filter 132 removes noise components (high frequency components) generated at the time of the frequency shift. The power arithmetic circuit 133 then determines a power value of the compound output of the carrier signals before undergone the peak suppression in computing. The set threshold value comparing circuit 134 compares the obtained power value with a peak suppression set value to detect a difference (error) between them. The multiplier 112 in each of the carrier transmitting circuit 101 calculates a coefficient (peak suppression value), by which the carrier signal is to be multiplied, according to the difference. The obtained peak suppression value is inputted to each of the multipliers 112 as a common value to the carrier transmitting circuits 101, and each of the carrier signals is multiplied by the same peak suppression value.

As above, the power peak value after the carrier signals are multiplexed by the carrier multiplexing circuit 102 can be prevented from falling in the saturation region of the power amplifier in the following stage, and generation of signal distortion can be effectively suppressed without an expensive amplifier having wide linearity in the input/output characteristics. The above peak suppression set value determines a PAR (Peak Average Ratio) of the transmitter's output. By decreasing this set value, more signal power is suppressed.

According to the technique described in Patent Document 1, the peak of transmission data of one symbol is detected by a peak detector, a dummy symbol is generated so as to cancel the peak when the detected peak is larger than the input limitation power of the transmission amplifier, the dummy symbol is subtracted from the transmission data of one symbol delayed by a symbol delay circuit to reduce the peak, a power correction value is calculated by a level adjustment calculating unit in order to compensate a change in power due to the subtraction, the transmission data is multiplied by the power correction value to correct the power (refer to the abstract of Patent Document 1).

According to the technique described in Patent Document 2, an envelope magnitude predictor obtains an estimation value of the magnitude of the envelope generated when the inputted base band signals are modulated, a scaling factor sufficient for reducing peak power spikes is obtained from a mapping table on the basis of a ratio of the estimation value to the a maximum acceptable envelop magnitude, the transmission signal is multiplied by the scaling factor, whereby the peak power spikes can be lowered (refer to the abstract of Patent Document 2).

[Patent Document 1] Japanese Patent Laid-Open No. 2000-106548

[Patent Document 2] Japanese National Publication of the Translated Version (of PCT Application) No. 2003-522433

However, when the peak suppression described above is performed, a part of the signal components is cut as described in paragraph 0008 in Patent Document 1, which causes generation of an output power error for each setting of the peak suppression at the output of the power amplifier after analog conversion.

Figure 10:
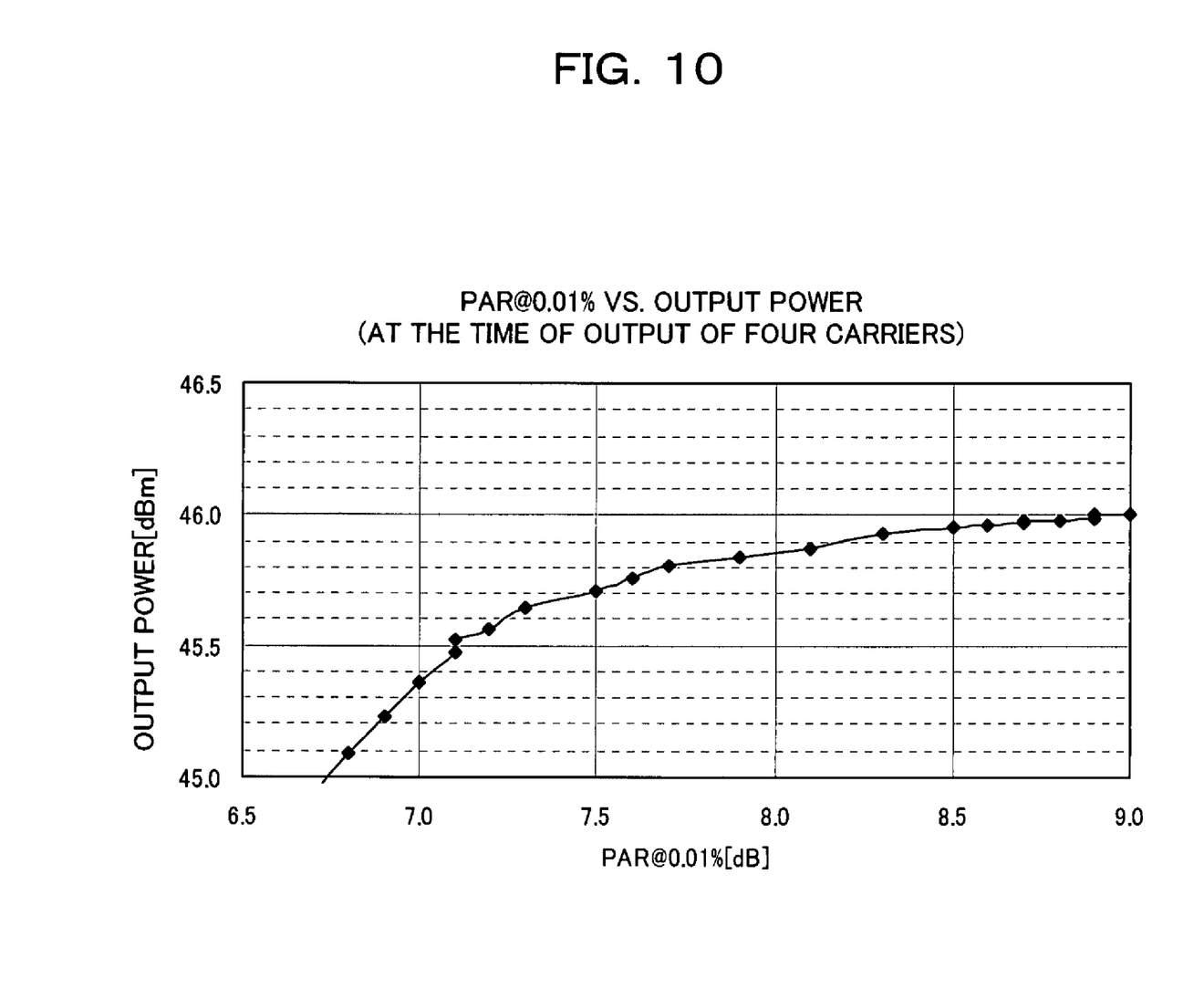
FIG. 10 is a diagram showing an example of a change in output power due to peak suppression in the structures shown in FIG. 9 when four carriers are inputted.
Figure 11:
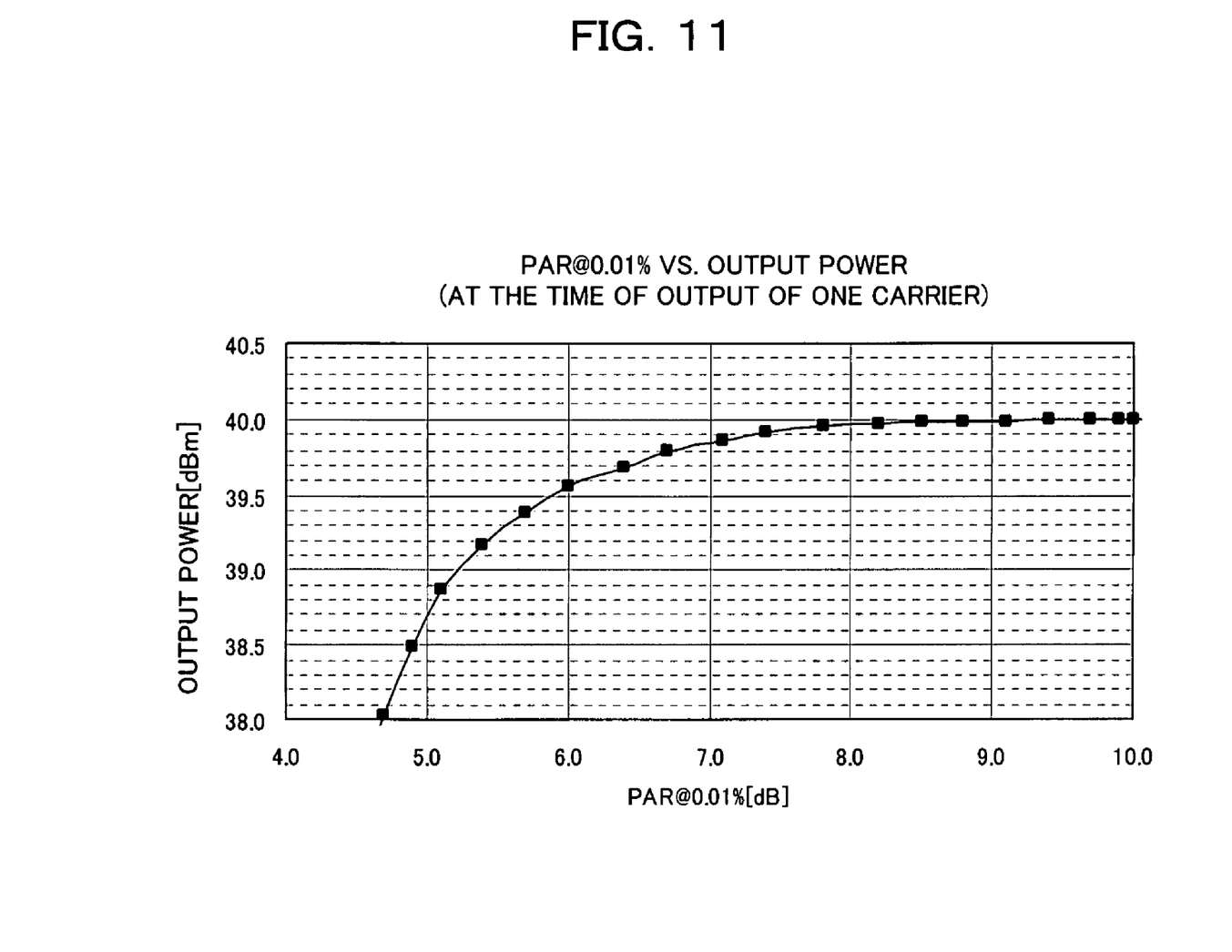
FIG. 11 is a diagram showing an example of a change in output power due to peak suppression in the structures shown in FIG. 9 when one carrier is inputted.

FIG. 10 shows a change in output power occurring due to the peak suppression when data having a normal output of +46.0 dBm in the case of four carriers is inputted, for example. FIG. 11 shows a change in output power occurring due to the peak suppression when data having a normal output power of 40.0 dBm in the case of one carrier is inputted. In FIGS. 10 and 11, when the PAR is set to 7.5 dB, for example, the output is +45.7 dBm in the case of four carriers, whereas the output is 39.9 dBm (approximately 40.0 dBm) at the time of one carrier. It is found from the above that an error of 0.3 dB generates as compared with the normal output.

In the present situation, the error caused by the peak suppression set value is corrected by that the peak suppression value is fixed and shared by the carriers as above, a gain setting position is provided at another position in the following stage to make the output power constant, in general. In such structure, an error does not generate in the same carrier setting because the peak suppression value is constant. However, a difference in the number of carriers causes an error although a difference in power between one carrier and four carriers should be 6.0 dB (four times). A difference in power due to a difference in the number of carriers should be 3.0 dB (two times) in the case of two carriers, and 4.8 dB (three times) in the case of three carriers, as compared with one carrier.

Since an error generating in each carrier setting is not defined in the specification of the transmission output, the generating error is left as it is. However, it is preferable that a desired transmission power can be obtained without an error even when the number of carriers or the carrier arrangement varies because the near-far problem exists in the communication systems using CDMA technology.

The techniques described in Patent Documents 1 and 2 allow suppression of the peak power in consideration of the saturation region of the power amplifier, that is, the input limitation power or the acceptable envelope, but pay no attention to the state of carriers (the number or arrangement). Thus, an error inevitably generates due to a difference in carrier setting.

SUMMARY OF THE INVENTION

In the light of the above problem, an object of the present invention is to provide an output power error absorbing circuit and a multi-carrier transmitter having the same, by which a desirable transmission (output) power can be always obtained in a device performing peak suppression according to the input limitation power of the power amplifier even when the number of carriers or the carrier frequency arrangement varies.

Therefore, the present invention provides an output power error absorbing circuit used in a multi-carrier transmitter having a peak suppressing function for suppressing a peak power generating in a multiplexed signal of a plurality of carrier signals by correcting a gain of each of the carrier signals before multiplexed according to a peak suppression setting, comprising a power correction value generating unit which determines a power correction value for minimizing an error, from a reference output power value of the multiplexed signal, generating due to peak power suppression under a carrier setting based on the carrier setting relating to either one or both of the number of the carrier signals and frequency arrangement, and the peak suppression setting, and an output power error correcting unit which corrects a signal gain before or after the carrier signals are multiplexed, using the power correction value obtained by the power correction value generating unit.

It is preferable that the power correction value generating unit comprises a reference output power value table which outputs the reference output power value beforehand obtained for each of the carrier settings differing from one another, a difference arithmetic unit which obtains difference information between the reference output power value outputted from the reference output power value table and a multiplexed power value of the carrier signals before undergone the peak suppression, a PAR table which outputs PAR information about a ratio of peak to average power beforehand obtained for each of the peak suppression settings differing from one another and each of the carrier settings differing from one another, an adder which adds the PAR information from the PAR table under the peak suppression setting and the carrier setting to the difference information obtained by the difference arithmetic unit, and outputs a result of the addition as present PAR information, and a correction value table which outputs a power correction value for minimizing the error beforehand obtained for the PAR information from the adder as a correction value used for gain correction by the output power error correcting unit to the output power error correcting unit.

The present invention further provides a multi-carrier transmitter with an output power error absorbing function, comprising a carrier multiplexing unit which multiplexes a plurality of carrier signals, a peak power suppressing unit which suppresses a peak power generating in a multiplexed signal which is an output of the carrier multiplexing unit by correcting a gain of each of the carrier signals before multiplexed by the carrier multiplexing unit according to a peak suppression setting, and an output power error absorbing circuit which corrects a signal gain before or after the multiplexing by the carrier multiplexing unit based on a carrier setting relating to either one or both of the number of the carrier signals and frequency arrangement, and the peak suppression setting so that an error from a reference output power value for the multiplexed signal generating due to the peak power suppression under the carrier setting is minimized.

The present invention still further provides an output power error absorbing circuit used in a multi-carrier transmitter having a peak suppressing function for suppressing a peak power generating in a multiplexed signal of a plurality of carrier signals by correcting a gain of each of the carrier signals before multiplexed according to a peak suppression setting, comprising a difference detecting unit which detects a difference between a multiplexed power value of the carrier signals before undergone the peak suppression and an output power value from the carrier multiplexing unit, and an output power error correcting unit which corrects a signal gain before or after the multiplexing by the carrier multiplexing unit so that the difference detected by the difference detecting unit is minimized.

The present invention still further provides a multi-carrier transmitter with an output power error absorbing function, comprising a carrier multiplexing unit which multiplexes a plurality of carrier signals, a peak power suppressing unit which suppresses a peak power of a multiplexed signal which is an output of the carrier multiplexing unit by correcting a gain of each of the carrier signals before multiplexed by the multiplexing unit according to a peak suppression setting, and an output power error absorbing circuit which detects a difference between a multiplexed power value of the carrier signals before undergone the peak suppression and an output power value of the carrier multiplexing unit to correct a signal gain before or after the multiplexing by the carrier multiplexing unit so that the difference is minimized.

According to this invention, it is unnecessary to perform absorption of an output power error generating for each setting value of peak suppression at another position in the following stage, and it is possible to always obtain a constant output power irrespective of a setting value of the peak suppression. It is also possible to absorb an output power error generating for each carrier setting, and always obtain a normal output power according to the number of carriers or carrier arrangement. It is expected to improve the efficiency of the power amplifier in the following stage while absorbing an output power error by further decreasing the set value although the generating error increases as the peak suppression set value is decreased.

BRIEF DESCRIPTION OF THE DRAWINGS

FIG. 6 is a diagram showing an example of contents (PAR vs. power correction value for each carrier pattern) of a ROM table shown in FIG. 1;

DESCRIPTION OF THE PREFERRED EMBODIMENTS

[A] Description of First Embodiment

Figure 1:
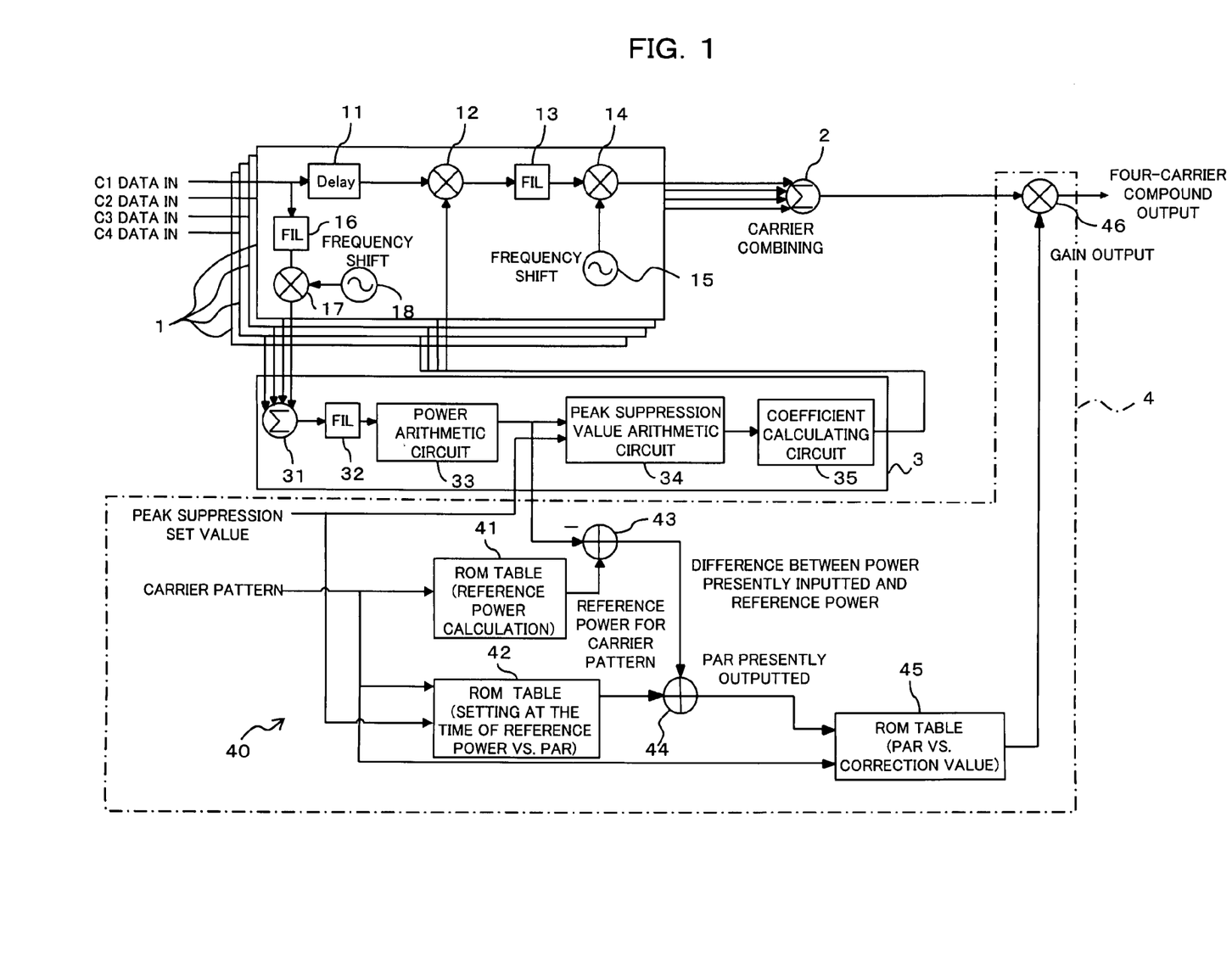
FIG. 1 is a block diagram showing structures of essential parts of a multi-carrier transmitter having an output power error absorbing circuit according to a first embodiment of the present invention.

FIG. 1 is a block diagram showing structures of essential parts of a multi-carrier transmitter having an output power error absorbing circuit according to a first embodiment of the present invention. The transmitter shown in FIG. 1 comprises a carrier transmitting circuit 1 provided for each of a plurality of carrier signals (here, four carriers of C1, C2, C3 and C4), a carrier combining circuit (carrier multiplexing unit) 2 for combining (multiplexing) outputs of the carrier transmitting circuits 1, a peak suppression value arithmetic circuit (peak power suppressing unit) 3 for detecting an output peak power of the carrier combining circuits 2, correcting the gain of each carrier signal before multiplexed by the carrier combining circuit 2 according to a peak suppression setting, thereby suppressing the output peak power, and an output power error absorbing circuit 4.

Each of the carrier transmitting circuits 1 transmits a signal (carrier signal) at a predetermined carrier frequency in this embodiment. As shown in FIG. 1, each of the carrier transmitting circuits 1 comprises a delay circuit 11, multipliers 12, 14 and 17, digital filters (for example, base band filters having the above RRC characteristic) 13 and 16, local oscillators 15 and 18. Basically, inputted carrier signal data is delayed by predetermined symbols by the delay circuit 11, then the inter symbol interference (ISI) is removed by the digital filter 13. The frequency of the data is shifted by the multiplier 114 and the local oscillator 15 so that the data is in a carrier frequency arrangement (carrier pattern) according to an external setting (carrier setting), then the data is outputted to the carrier combining circuit 2. Before the frequency of the data is shifted (that is, before the data is combined by the carrier combining circuit 2), a suppression value (power correction value) determined by the peak suppression value arithmetic circuit 3 is multiplied by the multiplier 12, whereby the peak power is beforehand suppressed so as not to fall within the saturation region of a power amplifier (not shown) in the following stage (that is, so as not to exceed the allowable input power value of the power amplifier).

In this embodiment, the peak suppression value arithmetic circuit (peak power suppressing unit) 3 comprises, as shown in FIG. 1, a combining (multiplexing) circuit 31, a digital filter 32, a power arithmetic circuit 33, a set threshold value comparing circuit 34 and a coefficient calculating circuit 35. The peak suppression value arithmetic circuit 3 is inputted each of carrier signals before peak suppression, which has been undergone the equivalent processes (inter-symbol interference removal and frequency shift) for each of the carrier signals to be inputted to the carrier combining circuit 2 by the digital filter 16, the multiplier 17 and the local oscillator 18 in the carrier transmitting circuit 1. The combining circuit 31 combines (multiplexes) the carrier signals, the digital filter 32 removes noise components (high-frequency components) generating due to the frequency shift, the power arithmetic circuit 33 determines a power value of a compound output of the carrier signals before the peak suppression. Although not shown in FIG. 1, a filter for removing noise components is disposed in the main signal system immediately after the multiplier 14 or in the following stage of the carrier combining circuit 2, for example.

In this embodiment, the set threshold value comparing circuit 34 compares the obtained power value with a peak suppression set value, whereby a difference (error) between them is detected. On the basis of the difference, the multiplier 12 in each of the carrier transmitting circuit 1 calculates a coefficient (peak suppression value) by which the carrier signal is multiplied. The obtained peak suppression value is inputted, as a value common to the transmitting circuits 1, to the multiplexer 12, and each of the carrier signals is multiplied by the same peak suppression value.

The output power error absorbing circuit 4 corrects a signal gain of the carrier signals after combined by the carrier combining circuit 2 on the basis of the above peak suppression set value and a setting (carrier setting) relating to both the number of the carrier signals and the frequency arrangement (carrier pattern) so as to minimize an error from a reference output power value of the carrier combining circuit 2 generating due to the above peak power suppression by the peak suppression value arithmetic circuit 3 under this carrier setting.

Figure 2A:
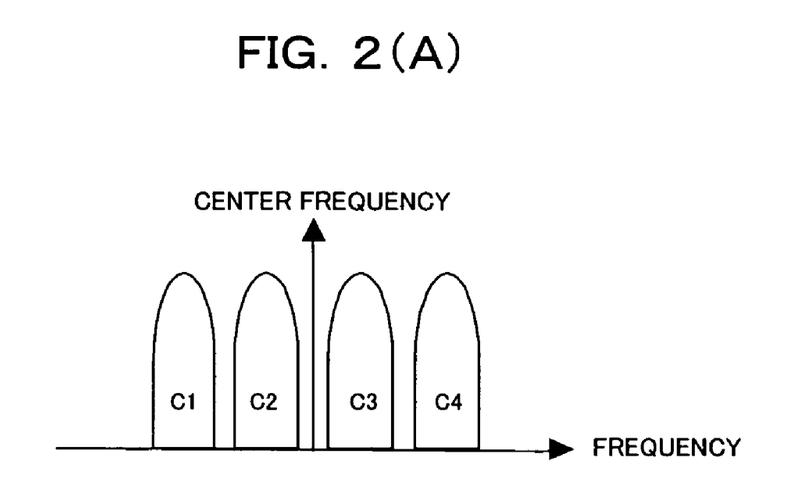
FIG. 2(A) is a diagram for illustrating carrier arrangement according to the first embodiment.
Figure 2B:
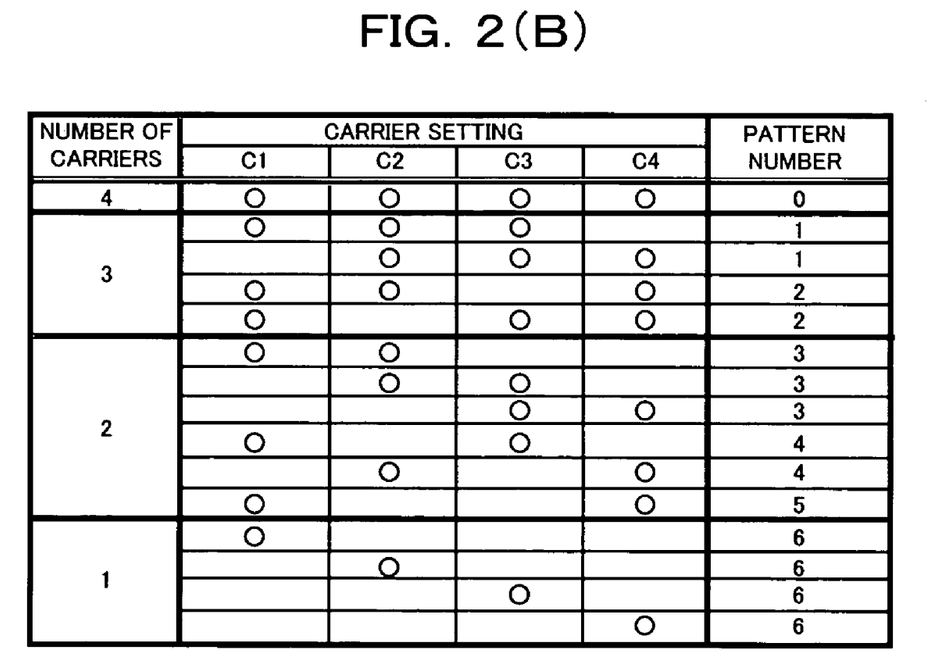
FIG. 2(B) is a diagram for illustrating the number of patterns according to the number of carriers and carrier arrangement according to the first embodiment.

When a maximum of two carriers, totaling four carriers, are set on the both sides of the center frequency as shown in FIG. 2(A), there are seven patterns in total as the above carrier patterns according to the number of carriers and the frequency arrangement as shown in FIG. 2(B). Concretely, when the number of carriers is four, one pattern (pattern number 0) exists for one type of carrier arrangement. When the number of carriers is three, two patterns (pattern numbers 1 and 2) exist for four types of carrier arrangement. When the number of carriers is two, three patterns (pattern numbers 3, 4 and 5) exist for six types of carrier arrangement. When the number of carriers is one, one pattern (pattern number 6) exists for four types of carrier arrangement. According to this embodiment, the gain of a carrier compound output is corrected so that the above error differing according to the type of the pattern is always minimized.

For this purpose, the output power error absorbing circuit 4 of this embodiment comprises, as shown in FIG. 1, ROM tables 41, 42 and 45, a subtractor 43 and an adder 44, as a power correction value generating unit 40 for determining a power correction value used to minimize an error from the above reference output power value, for example.

Figure 3:
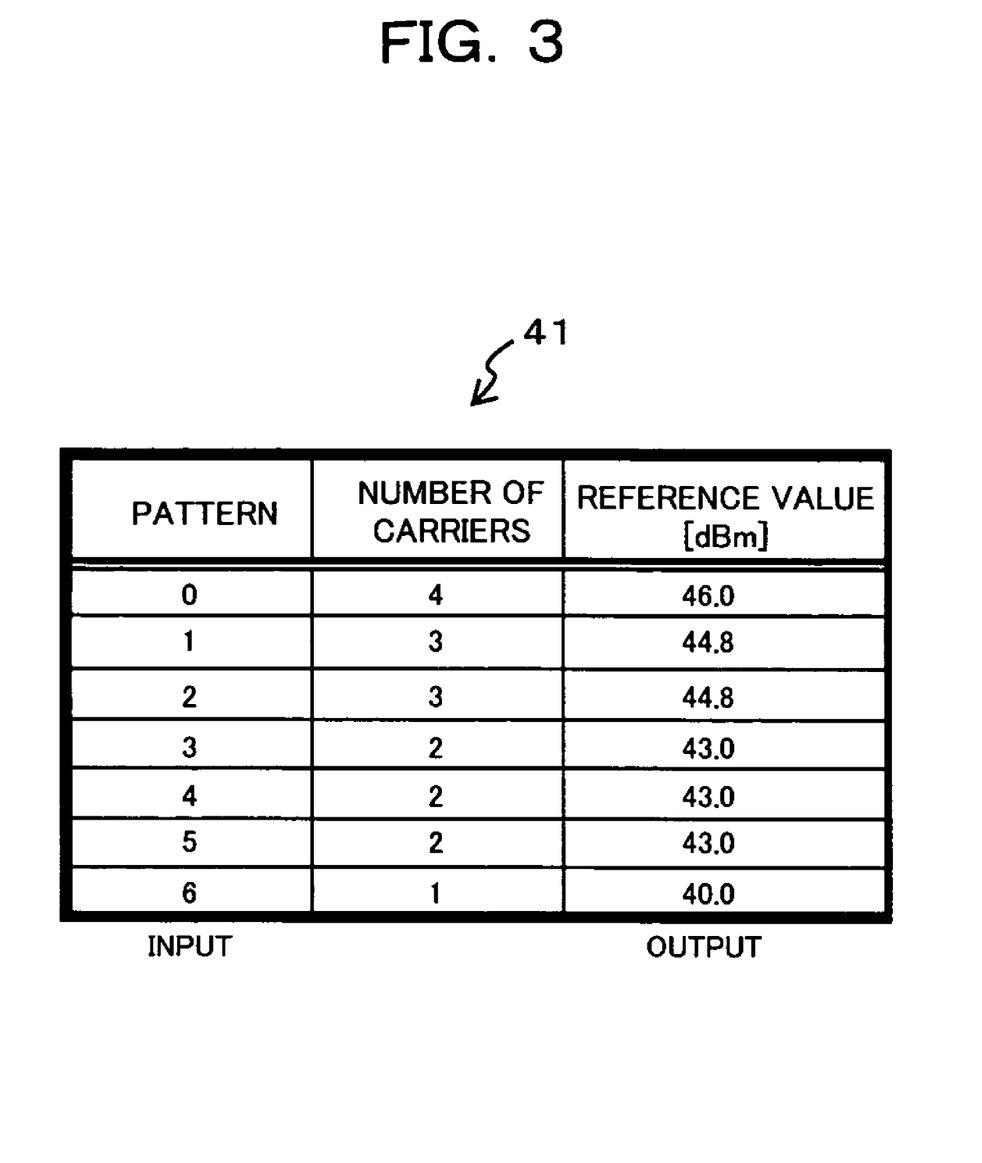
FIG. 3 is a diagram showing an example of contents (reference output power values for respective carrier patterns) of a ROM table shown in FIG. 1.
Figure 4:
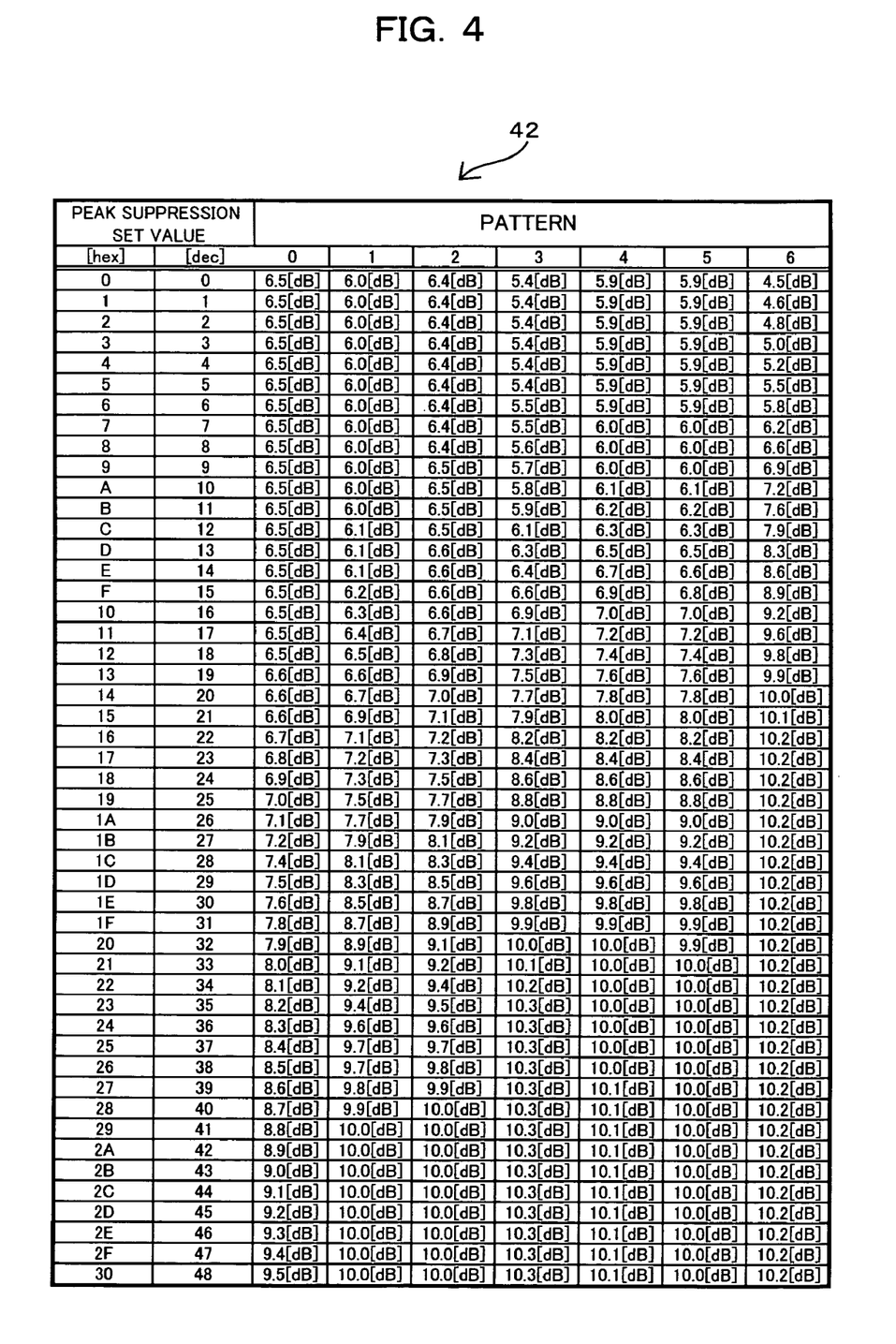
FIG. 4 is a diagram showing an example of contents (set value vs. PAR for each carrier pattern) of a ROM table shown in FIG. 1.
Figure 5:
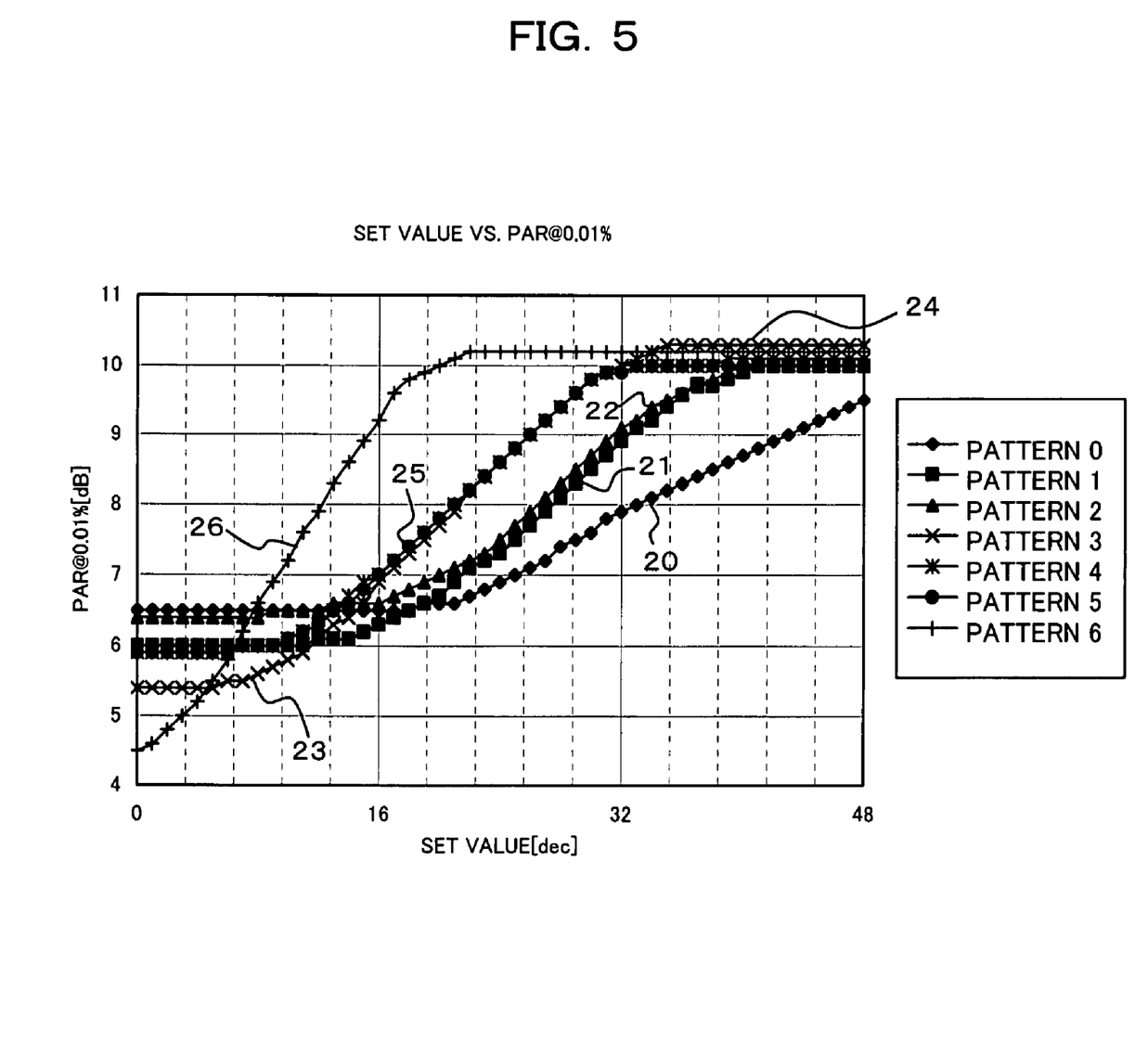
FIG. 5 is a diagram graphically showing numerical values in FIG. 4.

The ROM table (reference output power value table) 41 holds a normal output value (reference output power value) of the carrier combining circuit 2 beforehand obtained as data in the table form for each type of the above carrier arrangement (pattern numbers 0 through 6) in a memory such as a ROM or the like, converts an input of information (pattern number 0, 1, 2, . . . or 6) relating to the above pattern arrangement into a corresponding reference output power value, and outputs it. The ROM table 42 holds a PAR (peak to average power ratio) beforehand obtained for each peak suppressing set value (absolute value) at the time of the reference output power and for each type of the carrier arrangement in a memory such as a ROM or the like, converts a peak suppression set value (absolute value.) at the time of reference output power under the present carrier setting (carrier arrangement) to a PAR (in dB), and outputs it. Incidentally, values in two columns on the left side in FIG. 4 are peak suppression set values expressed in hexadecimal notation (hex) and decimal notation (dec). FIG. 5 graphically shows numerical values shown in FIG. 4. In FIG. 5, lines denoted by reference characters 20, 21, 22, 23, 24, 25 and 26 show the peak suppression set value vs. PAR of respective pattern numbers 0, 1, 2, 3, 4, 5 and 6.

Figure 7:
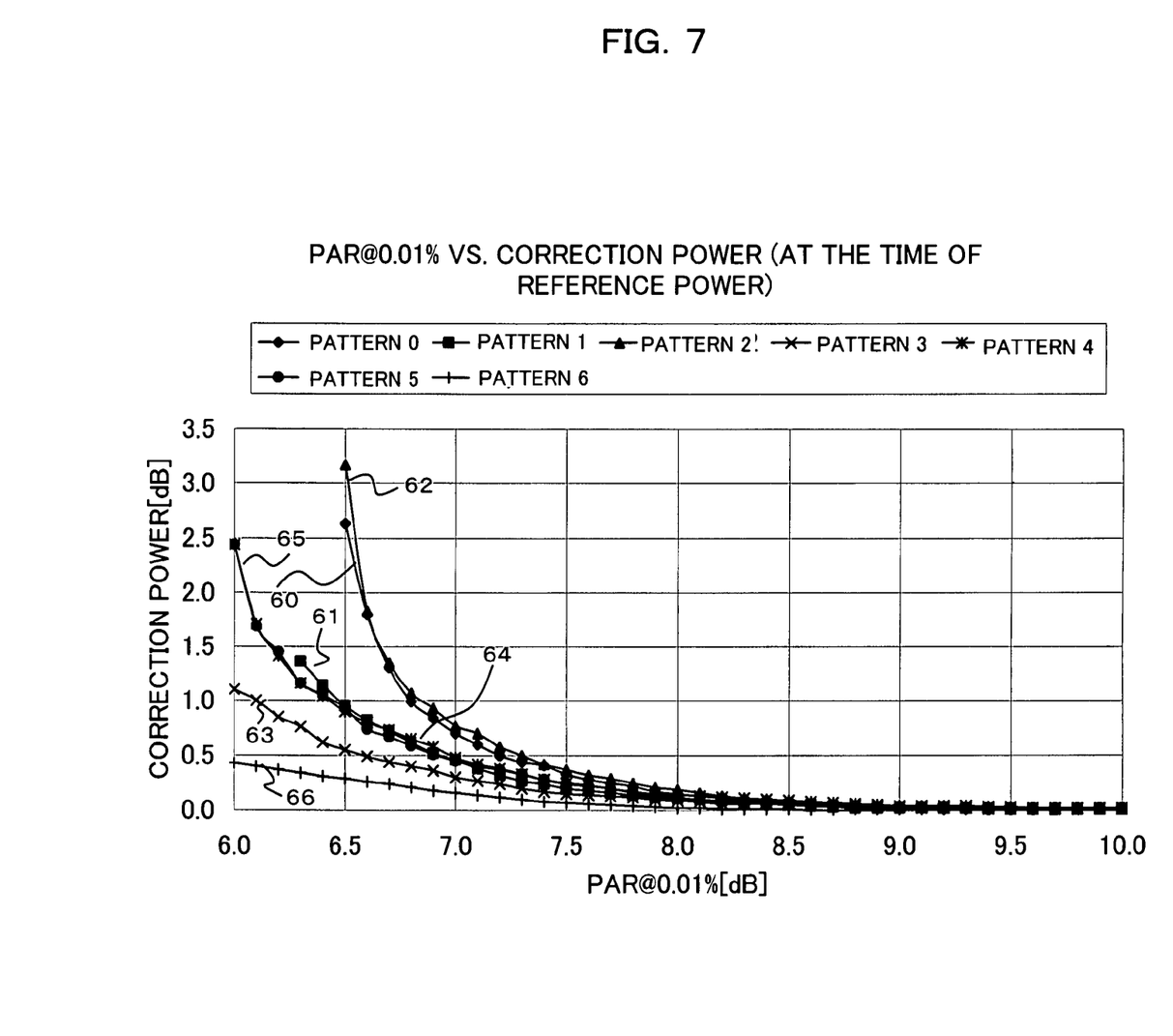
FIG. 7 is a diagram graphically showing numerical values in FIG. 6.

The ROM table 45 holds correction value data of a reference output power value beforehand obtained for each present PAR and for each type of the carrier arrangement, converts a PAR under present carrier setting (carrier arrangement) to a correction value, and outputs it, as shown in FIGS. 6 and 7, for example. FIG. 7 graphically shows numerical values in FIG. 6. In FIG. 7, lines denoted by reference characters 60, 61, 62, 63, 64, 65 and 66 show the PAR vs. correction value of respective pattern numbers 0, 1, 2, 3, 4, 5 and 6. Incidentally, the ROM tables 41, 42 and 45 may be stored in one memory, or in individual memories.

The subtractor 43 subtracts a power value obtained after the carriers are combined by the power arithmetic circuit 33 in the peak suppression value arithmetic circuit 3 from a reference output power value for a carrier pattern outputted from the ROM table 41 to obtain a difference between a power currently inputted and the reference output power. The adder 44 adds the difference obtained by the subtractor 43 and an output (PAR) of the ROM table 42, and outputs the result as the present PAR to the ROM table 45.

The multiplier (output power error correcting unit) 46 uses an output (power correction value) of the ROM table 45 for the present PAR obtained by the adder 44, that is, multiplies an output of the carrier combining circuit 2 by the output of the ROM table 45, to correct the gain of a compound output of the carrier signals, and cancels an error from the reference output power value, which generates in an output of the carrier combining circuit 2 under the present carrier setting due to peak suppression according to a peak suppression set value by the peak suppression value arithmetic circuit 3.

Hereinafter, description will be made of the operation of the multi-carrier output power error absorbing circuit with the above structure according to this embodiment. First, a carrier signal to be transmitted according to a carrier setting (carrier arrangement) is inputted to a corresponding carrier transmitting circuit 1. In the carrier transmitting circuit 1, the delaying circuit 11 delays the signal by predetermined symbols, and inputs the signal to the digital filter 13 via the multiplier 12. The filter 13 removes the inter symbol interference, and the multiplier 14 and the local oscillator 15 perform frequency shift according to the carrier setting. The carrier combining circuit 2 combines (multiplexes) outputs from the multipliers 14, and outputs the compound signal to the multiplier 46.

At this time, a part of the inputted carrier signal is branched before delayed by the delaying circuit 11, and inputted to the digital filter 16. The inter symbol interference of the signal is removed, and the signal is then undergone the frequency shift according to the carrier setting in a similar manner done in the system comprised of the filter 13, the multiplier 14 and the local oscillator 15, and inputted to the combining circuit 31 of the peak suppression value arithmetic circuit 3.

In the peak suppression value arithmetic circuit 3, the combining circuit 31 combines the inputted carrier signals before undergone the peak suppression, and the digital filter 32 removes noise components (high frequency components) of the compound signal and inputs the signal to the power arithmetic circuit 33. The power arithmetic circuit 33 determines a power value of the inputted signal (compound signal) in computing, and inputs the determined power value to the set threshold value comparing circuit 34. The set threshold value comparing circuit 34 compares the inputted power value with a peak suppression set value (absolute value) externally set to determine difference information between them. The coefficient calculating circuit 35 determines a coefficient (power correction value) for peak suppression, by which each carrier signal is multiplied by the multiplier 12, in each of the carrier transmitting circuits 1 on the basis of the difference information. The coefficient is inputted to the multiplier 12 to perform the peak suppression.

In the peak suppression value arithmetic circuit 3, when the inputted power is small, the peak quantity above the peak suppression set value is small because the peak suppression set value is set as an absolute value. When the inputted power is large, the peak quantity above the peak suppression set value is large. For this, the output power error absorbing circuit 4 determines a difference between the presently inputted power and the reference power on the basis of the ROM table 41 and a result of power computation. Namely, in the output power error absorbing circuit 4, the subtractor 43 determines a difference between a power value obtained by the power arithmetic circuit 33 in the peak suppression value arithmetic circuit 3 and a reference output power value for the present carrier setting (carrier pattern) in the ROM table 41.

When the number of inputted carriers is four (pattern number 0), a reference output power value of 46.0 dB is obtained from the contents of the ROM table 41. A difference between this value and a compound power value (power value obtained by the power arithmetic circuit 33) of the carrier signals inputted to the carrier transmitting circuits 1 at this point of time is determined.

On the other hand, the output power error absorbing circuit 4 determines, from the ROM table 42, a PAR [a ratio of peak to power (relative value)] at the time of reference power from the peak suppression set value differing according to the carrier pattern, and adds a result of this to the above power difference by means of the adder 44. A result of the addition is used as a PAR presently outputted, and inputted to the ROM table 45, whereby a correction value for the power presently inputted.

When the number of inputted carriers is four (pattern number 0) and the peak suppression set value is "10 (in hexadecimal notation)" ("16" in decimal notation), "6.5 dB" is obtained as a PAR at the time of reference power under the present peak suppression setting and carrier setting from contents of the ROM table 42. The difference in power obtained by the subtractor 43 is added to this value to correct the value, whereby the present PAR is determined. On the basis of this value, the ROM table 42 is retrieved, whereby a necessary power correction value under the present peak suppression setting and carrier setting is obtained.

The multiplier 46 multiplies in an output of the carrier combining circuit 2 by the obtained correction value to correct the gain according the peak suppression set value and carrier setting, thereby absorbing the output power error due to the peak suppression. Even when the carrier pattern (the number of inputted carriers or carrier arrangement) varies at the same peak suppression set value, it is possible to always set the output power of the carrier combining circuit 2 to a normal output power (reference output power) according to a relevant carrier pattern.

According to this embodiment, correction value data for an error in output according to a peak suppression set value and a carrier setting beforehand obtained is stored in a memory such as a ROM or the like, and a gain according to the present peak suppression set value and carrier setting is given after the carriers are multiplexed, whereby the output power error due to peak suppression can be absorbed, as above. It becomes thus unnecessary to perform absorption of the output power error generating for each set value for peak suppression at another position in the following stage, and it becomes possible to always obtain a constant output power irrespective of the set value for peak suppression. It is also possible to absorb the output power error generating in each carrier setting, and always obtain the normal output power according to the number of input carriers and carrier arrangement. Further, it is possible to improve the efficiency of the power amplifier in the following stage while absorbing the output power error by further decreasing the set value although the generating error is increased as the peak suppression set value is decreased.

In the above example, the multiplier 46 is disposed in the following stage of the carrier combining circuit 2 (that is, a signal obtained by multiplexing the carriers is gain-corrected). Alternatively, the multiplier may be disposed at a position after the peak suppression in each of the carrier transmitting circuits 1 to gain-correct a signal after the peak suppression but before the carrier multiplexing. This case can have effects equivalent to those in the above example.

In the above example, three tables 41, 42 and 45 are used in combination to obtain a power correction value for a peak suppression setting and carrier setting in the output power error absorbing circuit 4. However, this invention is not limited to this example. The structural elements of the power correction value generating unit 40 such as the number of tables, etc. can be ignored so long as the structure is equivalent to a structure which can finally yield a power correction value according to the peak suppression setting and carrier setting. In such case, the same working-effects as above can be obtained, of course.

[B] Description of Second Embodiment

Figure 8:
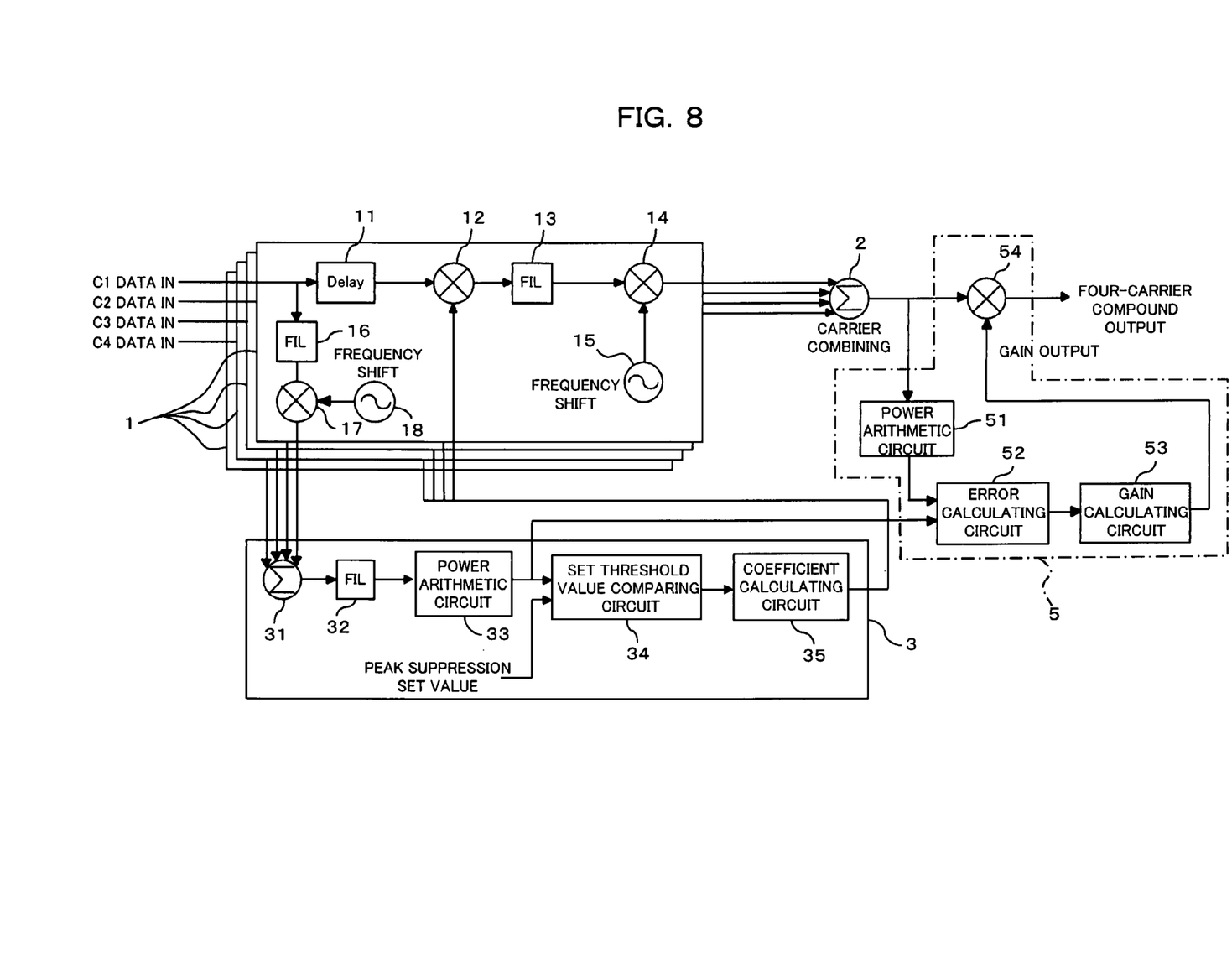
FIG. 8 is a block diagram showing structures of essential parts of a multi-carrier transmitter having an output power error absorbing circuit according to a second embodiment of the present invention.

FIG. 8 is a block diagram showing structures of essential parts of a multi-carrier transmitter having an output power error absorbing circuit according to a second embodiment of the present invention. The transmitter shown in FIG. 8 comprises carrier transmitting circuits 1, a carrier combining circuit 2 and a peak suppressing value arithmetic circuit 3 similar to those described above with reference to FIG. 1, along with an output power error absorbing circuit 5. The internal structures of the carrier transmitting circuit 1 and the peak suppressing value arithmetic circuit 3 are identical or similar to those described above with reference to FIG. 1. In FIG. 8, like reference characters designate like or corresponding parts in FIG. 1 unless specifically mentioned.

The output power error absorbing circuit 5 detects a difference between a multiplexed (compound) power value of the carrier signals before undergone peak suppression by the peak suppression value arithmetic circuit 3 and an output power value of the carrier combining circuit 2, and corrects the gain of the signals after multiplexed by the carrier combining circuit 2 so that the difference is minimized. For this purpose, the output power error absorbing circuit 5 comprises a power arithmetic circuit 51, an error calculating circuit 52, a gain calculating circuit 53 and a multiplier 54.

Like the power arithmetic circuit 33 in the peak suppression value arithmetic circuit 3, the power arithmetic circuit 51 determines an output power value of the carrier multiplexing unit 2 in computing. The error calculating circuit (difference detecting unit) 52 calculates a difference between the output power value determined by the power arithmetic circuit 51 and a multiplexed power value of the carrier signals before undergone the peak suppression, which is determined by the power arithmetic circuit 33 in the peak suppression value arithmetic circuit 3.

The gain calculating circuit (correction value calculating unit) 53 calculates a power correction value necessary to cancel a power difference obtained by the error calculating circuit 52. The multiplier (gain correcting unit) 54 multiplies an output of the carrier combining circuit 2 by the power correction value obtained by the gain calculating circuit 53 to correct the gain, thereby absorbing the output power error due to the peak suppression. Namely, the gain calculating unit 53 and the multiplier 54 together function as an output power error correcting unit for correcting the gain of the signals after multiplexed by the carrier combining circuit 2 so that the difference detected by the error calculating circuit 52 is minimized.

In the multi-carrier transmitter (output power error absorbing circuit 5) with the above structure according to this embodiment, a carrier signal to be transmitted according to a carrier setting (carrier arrangement) is inputted to a corresponding carrier transmitting circuit 1. In the carrier transmitting circuit 1 inputted the carrier signal, the delay circuit 11 delays the inputted carrier signal by predetermined symbols, and inputs the signal to the digital filter 13 via the multiplier 12. The filter 13 removes the inter symbol interference. The multiplier 14 and the local oscillator 15 perform the frequency shift according to the carrier setting. The carrier combining circuit 2 combines (multiplexes) outputs from the multipliers 14, and outputs the compound signal to the multiplier 54.

At this time, a part of the above inputted carrier signal is branched before delayed by the delay circuit 11, inputted to the digital filter 16 to remove the inter symbol interference, then the signal is undergone the frequency shift according to the carrier setting in the same manner done in the system comprised of the filter 13, the multiplier 14 and the local oscillator 15, and inputted to the combining circuit 31 in the peak suppression value arithmetic circuit 3.

In the peak suppression value arithmetic circuit 3, the combining circuit 31 combines the inputted carrier signals before undergone the peak suppression, and the digital filter 32 removes noise components (high frequency components generating at the time of the above frequency shift) in the compound signal and inputs the signal to the power arithmetic circuit 33. The power arithmetic circuit 33 determines a power value of the inputted signal (compound signal) in computing, and inputs the power value to the set threshold value comparing circuit 34. The set threshold value comparing circuit 34 compares the inputted power value and a peak suppression set value externally set to determine difference information between them. The coefficient calculating circuit 35 determines a coefficient (power correction value) for peak suppression, by which each carrier signal is to be multiplied by the multiplier 12, in each of the carrier transmitting circuits 1 on the basis of the difference information. The coefficient is inputted to the multiplier 12 to perform peak suppression.

In the output power absorbing circuit 5, the power arithmetic circuit 51 determines an output power value of the carrier combining circuit 2, and the error calculating circuit 52 calculates a difference between the output power value and a power value obtained by the power arithmetic circuit 33 in the peak suppression value arithmetic circuit 3. Namely, results of power computation of the carrier multiplexed signal before and after the peak suppression are compared to calculate a power error. The gain calculating circuit 53 determines a power correction value for canceling the power error, and inputs it to the multiplier 54, whereby the gain of the signal after the carriers are multiplexed is corrected and the output power error due to the peak suppression is absorbed.

According to the second embodiment, results of computation of the actual power of the carrier multiplexed signal before and after the peak suppression are monitored (compared) to determined a difference in the power, and the gain of the signal after the carriers are multiplexed is corrected so that the difference in the power is canceled, as described above. It is thus possible to absorb the output power error generating under the peak suppression setting and carrier setting to always yield a normal output power value according to the number of carriers and carrier arrangement.

In the above example, the multiplier 54 is disposed in the following stage of the carrier combining circuit 2 (namely, a signal obtained by multiplexing the carriers is gain-corrected). It is alternatively possible to dispose the multiplier at a position after the peak suppression in each of the carrier transmitting circuits 1 so that each carrier signal after the peak suppression but before the carrier multiplexing is gain-corrected. In such case, the equivalent working effects to those provided in the above example can be obtained.

The gain computation (multiplying) by the multiplier 54 may be performed by hardware. The comparing of results of computation of powers by the error calculating circuit 52 and the calculation by the gain calculating circuit 53 may be performed by hardware such as a DSP (Digital Signal Processor) or the like, or may be performed by software. In either case, it is possible to have the equivalent working effects to the those provided in above example.

As having been described above in detail, it is possible to absorb the output power error generating in each carrier setting, and always obtain a normal output power according to the number of carriers and the carrier arrangement without an error. Therefore, this invention is very useful in the field of multi-carrier radio communications.

What is claimed is:

1. An output power error absorbing circuit used in a multi-carrier transmitter having a peak suppressing function for suppressing a peak power generating in a multiplexed signal of a plurality of carrier signals by correcting a gain of each of said carrier signals before multiplexed according to a peak suppression setting, comprising:
    a power correction value generating unit which determines a power correction value for minimizing an error, from a reference output power value of said multiplexed signal, generating due to peak power suppression under a carrier setting based on said carrier setting relating to either one or both of the number of said carrier signals and frequency arrangement, and said peak suppression setting; and
    an output power error correcting unit which corrects a signal gain before or after said carrier signals are multiplexed, using said power correction value obtained by said power correction value generating unit.

2. The output power error absorbing circuit according to claim 1, wherein said power correction value generating unit comprises:
    a reference output power value table which outputs said reference output power value beforehand obtained for each of said carrier settings differing from one another;
    a difference arithmetic unit which obtains difference information between said reference output power value outputted from said reference output power value table and a multiplexed power value of said carrier signals before undergone the peak suppression;
    a PAR table which outputs PAR information about a ratio of peak to average power beforehand obtained for each of said peak suppression settings differing from one another and each of said carrier settings differing from one another;

an adder which adds said PAR information from said PAR table under said peak suppression setting and said carrier setting to said difference information obtained by said difference arithmetic unit, and outputs a result of the addition as present PAR information; and a correction value table which outputs a power correction value for minimizing said error beforehand obtained for said PAR information from said adder as a correction value used for gain correction by said output power error correcting unit to said output power error correcting unit.

3. A multi-carrier transmitter with an output power error absorbing function, comprising:

a carrier multiplexing unit which multiplexes a plurality of carrier signals;

a peak power suppressing unit which suppresses a peak power generating in a multiplexed signal which is an output of said carrier multiplexing unit by correcting a gain of each of said carrier signals before multiplexed by said carrier multiplexing unit according to a peak suppression setting; and an output power error absorbing circuit which corrects a signal gain before or after the multiplexing by said carrier multiplexing unit based on a carrier setting relating to either one or both of the number of said carrier signals and frequency arrangement, and said peak suppression setting so that an error from a reference output power value for said multiplexed signal generating due to the peak power suppression under said carrier setting is minimized.

4. The multi-carrier transmitter according to claim 3, wherein said output power absorbing circuit comprises:

a power correction value generating unit which determines a power correction value for minimizing said error from said reference output power value for said multiplexed signal generating due to the peak power suppression under said carrier setting based on said peak suppression setting and said carrier setting; and an output power error correcting unit which corrects a signal gain before or after said carrier signals are multiplexed, using said power correction value obtained by said power correction value generating unit.

5. The multi-carrier transmitter according to claim 4, wherein said power correction value generating unit comprises:

a reference output power value table which outputs said reference output power value beforehand obtained for each of said carrier settings differing from one another;

a difference arithmetic unit which obtains difference information between said reference output power value outputted from said reference output power value table and a multiplexed power value of said carrier signals before undergone the peak suppression;

a PAR table which outputs PAR information about a ratio of peak to average power ratio beforehand obtained for each of said peak suppression settings differing from one another and each of said carrier settings differing from one another;

an adder which adds said PAR information from said PAR table under said peak suppression setting and said carrier setting to said difference information obtained by said difference arithmetic unit, and outputs a result of the addition as present PAR information; and a correction value table which outputs a power correction value for minimizing said error beforehand obtained for said PAR information from said adder as a correction value used for gain correction by said output power error correcting unit to said output power error correcting unit.

6. An output power error absorbing circuit used in a multi-carrier transmitter having a peak suppressing function for suppressing a peak power generating in a multiplexed signal of a plurality of carrier signals by correcting a gain of each of said carrier signals before multiplexed according to a peak suppression setting, comprising:

a difference detecting unit which detects a difference between a multiplexed power value of said carrier signals before undergone the peak suppression and an output power value from said carrier multiplexing unit; and an output power error correcting unit which corrects a signal gain before or after the multiplexing by said carrier multiplexing unit so that said difference detected by said difference detecting unit is minimized.

7. The output power error absorbing circuit according to claim 6, wherein said output power error correcting unit comprises:

a correction value calculating unit which calculates a power correction value for minimizing said difference detected by said difference detecting unit; and a gain correcting unit which corrects a gain of an output of said carrier multiplexing unit using said power correction value obtained by said correction value calculating unit.

8. The output power error absorbing circuit according to claim 7, wherein said calculating unit is comprised of software, and said gain correcting unit is comprised of a hardware multiplier for multiplying an output of said carrier multiplexing unit by said power correction value.

9. A multi-carrier transmitter with an output power error absorbing function, comprising:

a carrier multiplexing unit which multiplexes a plurality of carrier signals;

a peak power suppressing unit which suppresses a peak power of a multiplexed signal which is an output of said carrier multiplexing unit by correcting a gain of each of said carrier signals before multiplexed by said multiplexing unit according to a peak suppression setting; and an output power error absorbing circuit which detects a difference between a multiplexed power value of said carrier signals before undergone the peak suppression and an output power value of said carrier multiplexing unit to correct a signal gain before or after the multiplexing by said carrier multiplexing unit so that said difference is minimized.

10. The multi-carrier transmitter according to claim 9, wherein said output power error absorbing circuit comprises:

a difference detecting unit which detects a difference between a multiplexed power value of said carrier signals before undergone the peak suppression and an output power value from the carrier multiplexing unit; and an output power error correcting unit which corrects a signal gain before or after the multiplexing by said carrier multiplexing unit so that said difference detected by said difference detecting unit is minimized.

11. The multi-carrier transmitter according to claim 10, wherein said output power error correcting unit comprises:

a calculating unit which calculates a power correction value for minimizing said difference detected by said difference detecting unit; and a gain correcting unit which corrects a gain of an output of said carrier multiplexing unit using said power correction value obtained by said calculating unit.

12. The multi-carrier transmitter according to claim 11, wherein said calculating unit is comprised of software, and said gain correcting unit is comprised of a hardware multiplier for multiplying an output of said carrier multiplexing unit by said power correction value.

* * * * *